United States Patent
Peairs et al.

(10) Patent No.: US 6,957,235 B2
(45) Date of Patent: Oct. 18, 2005

(54) AUTOMATIC DOCUMENT ARCHIVING FOR A COMPUTER SYSTEM

(75) Inventors: Mark Peairs, Menlo Park, CA (US);
Jonathan J. Hull, Cupertino, CA (US);
John Cullen, Redwood City, CA (US);
Kiyoshi Suzuki, Tokyo (JP)

(73) Assignees: Ricoh Company Ltd., Tokyo (JP);
Ricoh Corporation, West Caldwell, NJ (US)

( * ) Notice: Subject to any disclaimer, the term of this patent is extended or adjusted under 35 U.S.C. 154(b) by 923 days.

(21) Appl. No.: 09/759,002

(22) Filed: Jan. 11, 2001

(65) Prior Publication Data

US 2001/0016852 A1 Aug. 23, 2001

Related U.S. Application Data (63) Continuation of application No. 08/938,137, filed on Sep. 26, 1997, now Pat. No. 6,199,073, which is a continuation-in-part of application No. 08/754,721, filed on Nov. 21, 1996, now Pat. No. 5,978,477.

(51) Int. Cl.[7] .............................................. G06F 17/30
(52) U.S. Cl. ........................................ 707/204; 707/5
(58) Field of Search ............................... 707/1, 5, 102, 707/204

(56) References Cited

U.S. PATENT DOCUMENTS

| | | | | | |
|---|---|---|---|---|---|
| 4,358,824 | A | * | 11/1982 | Glickman et al. | 707/5 |
| 4,941,125 | A | * | 7/1990 | Boyne | 707/102 |
| 5,742,807 | A | * | 4/1998 | Masinter | 707/1 |
| 5,978,477 | A | * | 11/1999 | Hull et al. | 707/204 |
| 6,115,509 | A | * | 9/2000 | Yeskel | 707/1 |
| 6,199,073 | B1 | * | 3/2001 | Peairs et al. | 707/204 |
| 6,592,629 | B1 | * | 7/2003 | Cullen et al. | 715/530 |
| 6,665,086 | B2 | * | 12/2003 | Hull et al. | 707/204 |
| 6,704,118 | B1 | * | 3/2004 | Hull et al. | 707/204 |

* cited by examiner

*Primary Examiner*—Salvatore Cangialosi
(74) *Attorney, Agent, or Firm*—Blakely, Sokoloff, Taylor & Zafman LLP

(57) ABSTRACT

A system and method for processing documents is described. The system and method provide for executing a command as part of the execution of an application program, where execution of the command causes the transfer of the document between a processing device in a computer system and a peripheral device. The present invention also provides for transferring the document data between the processing device and the peripheral device in response to the command. The present invention further provides for archiving the document data in a memory in the computer system in response to the command and transparently to the execution of the application program.

37 Claims, 4 Drawing Sheets

AUTOMATIC DOCUMENT ARCHIVING FOR A COMPUTER SYSTEM

This is a Continuation of prior application Ser. No. 08/938,137, filed Sep. 26, 1997, now U.S. Pat. No. 6,199,073, entitled "Automatic Document Archiving for a Computer System", which is a continuation-in-part application of application Ser. No. 08/754,721, entitled, "Automatic And Transparent Document Archiving", filed Nov. 21, 1996 now U.S. Pat. No. 5,978,477.

FIELD OF THE INVENTION

The present invention relates to the field of document management systems; more particularly, the present invention relates to providing automatic archiving for computer systems.

BACKGROUND OF THE INVENTION

Traditionally, document management required that vast amounts of documents be shipped to storage facilities only to necessitate retrieval when needed. The result was an inordinate and unnecessary expense of both time and money. Recently, however, the cost of storing an image of a sheet of paper on digital media has become less than the cost of printing and storing the sheet of paper itself. This development has been produced by the rapid development of storage system technology.

Managing conventional digital document storage systems may present several problems. Conventional document storage systems require that a user manually scan every document on a digital scanner in order to create an image of a document that may be archived in digital storage. Consequently, in order to archive a document, a scanner must be available to the potential user. Notwithstanding the availability of a scanner, a user must remember that a document needs to be scanned in order to create an archive. In addition, the scanning process may be time consuming if it is necessary to scan thousands of document pages. Therefore, an automatic digital document management system is desired.

SUMMARY OF THE INVENTION

A system and method for processing documents is described. The system and method provide for executing a command as part of the execution of an application program, where execution of the command causes the transfer of the document between a processing device in a computer system and a peripheral device. The present invention also provides for transferring the document data between the processing device and the peripheral device in response to the command. The present invention further provides for archiving the document data in a memory in the computer system in response to the command and transparently to the execution of the application program.

BRIEF DESCRIPTION OF THE DRAWINGS

The present invention is illustrated by way of example and not limited to the figures of the accompanying drawings in which.

DETAILED DESCRIPTION OF THE PRESENT INVENTION

An apparatus and method for document and data storage is described. In the following description, numerous details are set forth, such as specifies number of signals, types of data and storage formats, etc. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions described below are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or "displaying" or the like, may refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Also as discussed below, the present invention relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magneto-optical disks, read-only memories (ROMs), random access memories (RAMs), EPROMs, EEPROMS, magnetic or optical cards, or any type of media suitable for storing electronic instructions, and each coupled to a computer system bus. The algorithms presented herein are not inherently related to any particular computer or other apparatus. Various general purpose machines may be used with programs in accordance with the teachings herein, or it may prove convenient to construct more specialized apparatus to perform the required steps. The required structure for a variety of these machines will appear from the description below. In addition, the present invention is not described with reference to any particular programming language. It will be appreciated that a variety of programming languages may be used to implement the teachings of the invention as described herein.

OVERVIEW OF THE PRESENT INVENTION

The present invention provides for processing documents in a computer system so as to automatically archive document data that is being transferred between a computer system and some peripheral device (or network interface). The present invention sets forth executing a command to transfer a document between a processing device, such as a processor in a computer system, and a peripheral device such as a printer, fax machine, copier, network interface (to send/receive electronic mail messages), or any other network type of peripheral device. The execution of the command is performed during execution of an application program in the computer system. In response to the command, the document is transmitted between the processing device and the peripheral device. Also, in response to the command and transparent to the application program, the document data is archived in a memory in (or attached to and accessible by) the computer system. In one embodiment, the archiving is also performed transparent to the operating system running on the computer system.

For the purposes of the present invention, an application program may refer to a program, module or set of instructions or executable code. Note that the application programs of the present invention may enable or cause the transfer of document data within the computer system.

In one embodiment of the present invention, the archiving of documents occurs from running software in the computer system that monitors device drivers for the peripheral device. When the device drivers operate to transfer document data to a peripheral device, or vice versa, the document data is captured and converted into an image and both the original format of the data (e.g., postscript) and the image are stored in the memory in a computer system. In alternative embodiment, only the image is stored.

The memory that stores the archived document data may be one or more of many memories in the computer system. In one embodiment, the memory is partitioned between a file archiving system and a document archiving system. That is, the memory is divided to store archived document data as well as files that are used by various programs that may be run on the computer system.

In one embodiment, the document data is stored as entries in a database maintained in the memory. The memory could be the hard drive, random access memory (dynamic or static), cache memory, optical storage, other auxiliary memory in the computer system, or a memory in a remote storage facility. Furthermore, the database or memory may be maintained in a peripheral device designed for document image storage (e.g., a paperless printer).

The present invention operates with numerous peripheral devices each of which may be an input/output (I/O) device or a device coupled to a network interface in the computer system.

In the present invention, the computer system provides access to archived documents via an interface. In one embodiment, the interface may be a browser, such as Internet and World Wide Web browsers. The interface may provide access to both the archived documents and files stored in the memory.

Figure 1:
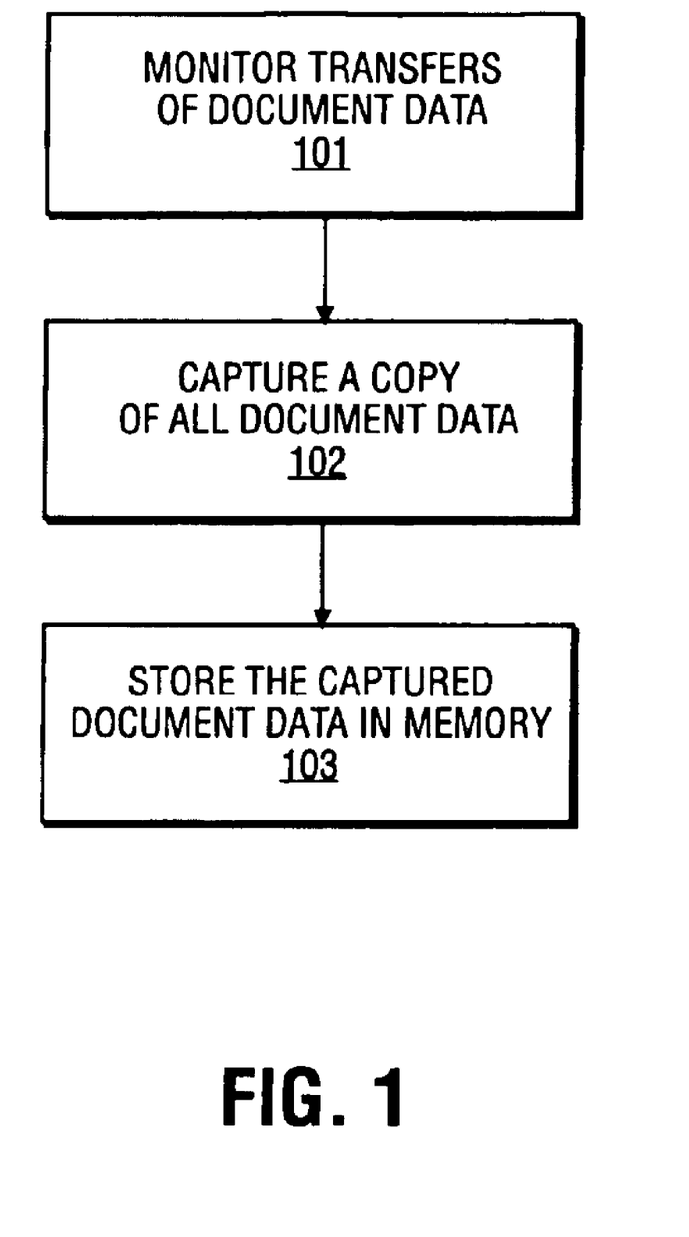
FIG. 1 illustrates a flow diagram of the archiving performed by the present invention.

FIG. 1 illustrates a flow diagram of the archiving process of the present invention. The archiving process is performed by processing logic. The processing logic may be hardware, software or a combination of both. Referring to FIG. 1, the archiving process begins by processing logic monitoring transfers of document data between at least one processing device running application programs in the computer system and peripheral devices in the computer system (processing block 101). Then, processing logic captures a copy of all document data generated as outputs by the application programs running on a computer system transparently to those application programs (processing block 102). The processing logic then stores the captured document data in memory in the computer system (processing block 103). The capturing of the document data may be such that every time a document is sent to a device via a device driver (or otherwise), a copy may also be sent to the archiving portion of a memory. This may be done in the same manner as printing to a file.

Note that the present invention may be extended to not only save copies of documents being transferred, but also save each version of a document being generated. Thus, the present invention provides for archiving each version of a document by capturing versions of the document at one or more predetermined times or according to a predetermined time interval.

Figure 2:
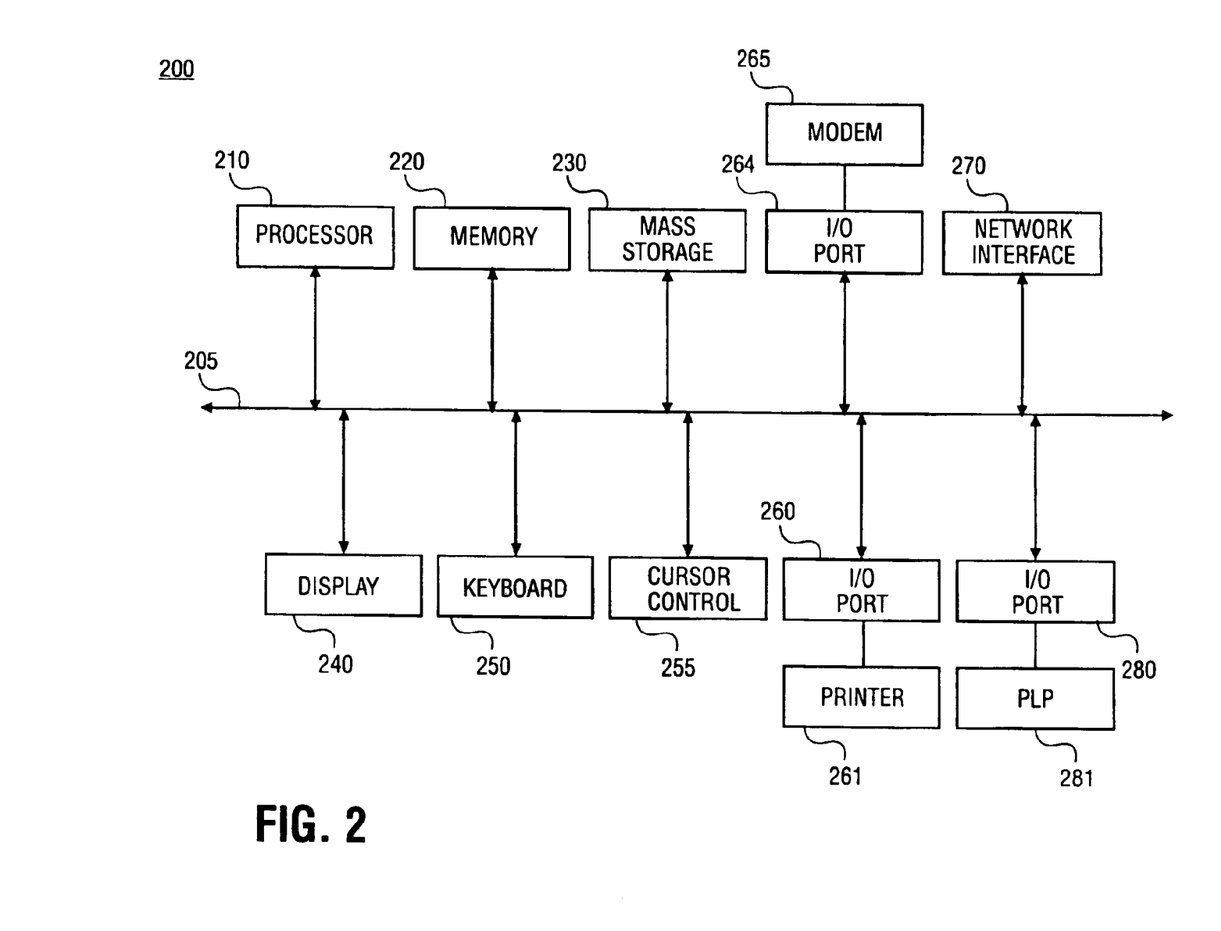
FIG. 2 illustrates a block diagram of one embodiment of a computer system of the present invention.

FIG. 2 illustrates one embodiment of a computer system 200 that performs automatic document archiving according to the present invention. Computer system 200 includes a bus 205 for communicating information and a processor 210 coupled to bus 205 for processing information (e.g., executing application programs). Computer system 200 further includes a random access memory (RAM) or other dynamic storage device 220 (referred to as memory), coupled to bus 205 for storing information and instructions to be executed by processor 210. The instructions may include application programs, an operating system, and other software programs, and code modules that may facilitate operations of the present invention. Memory 220 may also be used for storing temporary variables or other intermediate information during execution of instructions by processor 210. Computer system 200 also includes a mass storage device 230 (e.g., magnetic disk, optical disk, etc.) coupled to bus 205 for storing information and instructions.

Computer system 200 may further include a display device 240, such as a cathode ray tube (CRT) coupled to bus 205 for displaying information to a computer user. An alphanumeric input device (keyboard) 250 may also be coupled to bus 205 for communicating information and command selections to processor 210. An additional user input device is cursor control 255, such as a mouse, a trackball, or cursor direction keys, coupled to bus 205 for communicating direction information and command selections to processor 210.

Input/Output (I/O) ports 260, 264 and 280 may also be coupled to bus 205. I/O port 260 is coupled to printer 261 which may be used for printing information on a medium such as paper, film, or similar types of media. Also, computer system 200 may include a modem 265 coupled to I/O port 264 for sending and receiving information to and from other computer systems or facsimile machines. Computer system 200 may further include a paperless printer (PLP) 281 that is coupled to I/O port 280. PLP 281 may comprise a file server to store digital images of documents. The addition of PLP 281 may free up storage space in mass storage 230. In alternative embodiments, I/O ports 260, 264 and 280 may be coupled to other peripheral devices (e.g., a digital camera).

Finally, computer system 200 includes a network interface 270 coupled to bus 205. Network interface 270 provides signals to the computer system that are necessary to interface with a local area network (LAN) (not shown to avoid obscuring the present invention). Network interface 270 transmits and receives electronic mail, as well as other information, to and from other computer systems on the LAN. In alternative embodiments, network interface 270 may interface with other network systems (e.g., wide area network (WAN) systems, the Internet, etc.).

The devices and subsystems embodied in FIG. 2 may be coupled in different ways. In addition, many other devices or subsystems (not shown) may be coupled in a similar manner. Further, it is not necessary for all devices shown in FIG. 2 to be present to practice the present invention.

Figure 3:
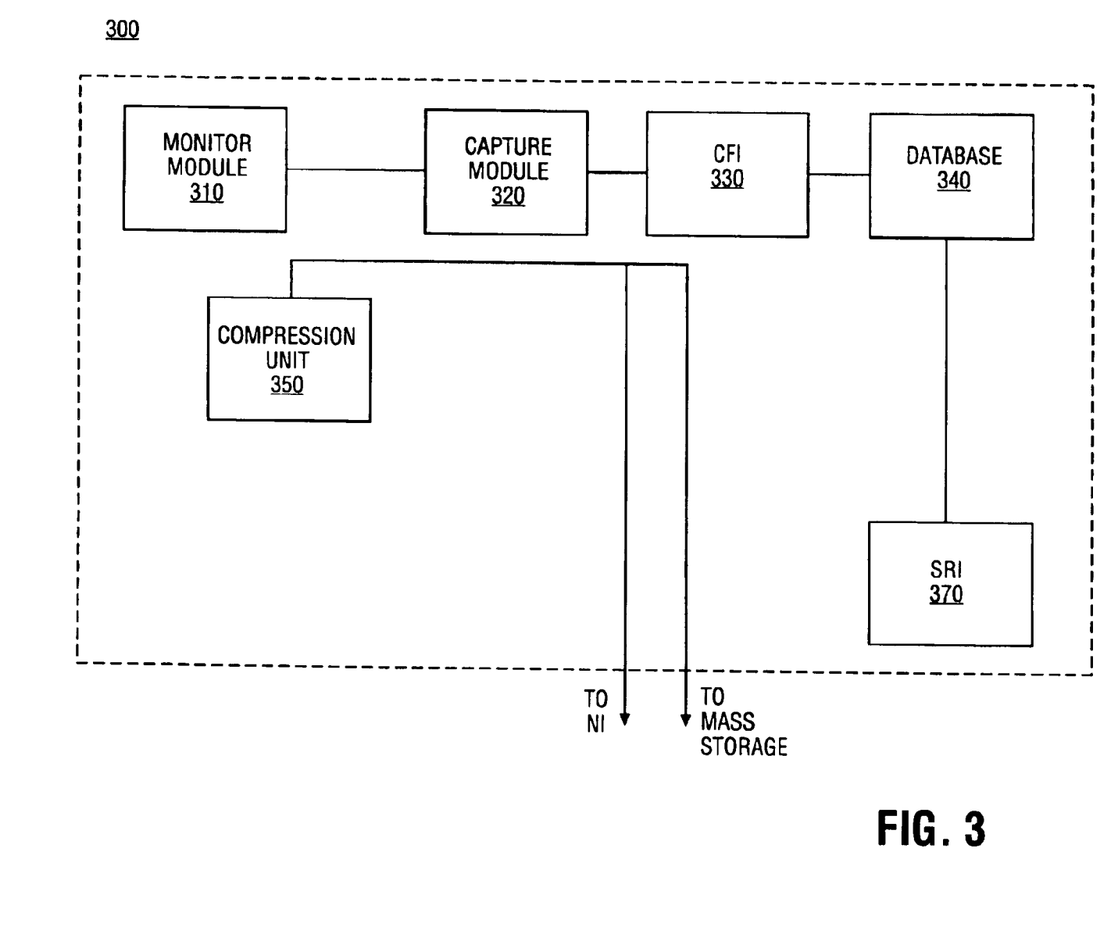
FIG. 3 illustrates one embodiment of an Image Management system of the present invention.

FIG. 3 illustrates an Image Management (IM) system 300 according to one embodiment of the present invention. In the present invention, IM system 300 automatically archives documents that are transmitted to printer 261, modem 265, or network interface 270. The documents may be stored as digital images. To that end, IM system 300 coverts document data into images, where necessary, for storage in the computer system.

In one embodiment, IM system 300 comprises a monitoring module 310, a capture module 320, a conversion of formats and indexing module (CFI) 330, a database module 340, a compression unit 350, and a search and retrieval interface (SRI) 370. In one embodiment, each of these modules comprises hardware (e.g., hardwired logic), software, or a combination of both. According to one embodiment, IM system 300 may be operably disposed in memory 220. In addition, IM system 300 may activate or deactivate the archiving function in a selectable manner. In alternative embodiments, IM system 300 may be stored in mass storage 230 or a remote storage system.

According to one embodiment, monitoring module 310 monitors the activity of device drivers for network interface 270 and I/O ports 260 and 264 for an indication (e.g., signal, interrupt) to indicate that a document is being transferred. In an alternative embodiment, the address bus may be monitored to identify if an address associated with one of these devices is being transferred, thereby indicating the transfer of a document. These indications are made in response to a user command to deliver a document in an executing application program, causing the document data to be transferred to the destined I/O port, network interface 270, or other peripheral device location. In one embodiment, prior to the document data being transferred to printer 261, modem 265 or network interface 270, an interrupt signal may be sent to initiate the transaction. In this case, monitoring module 310 detects the interrupt signal as the signal is received at either network interface 270, I/O port 260 or I/O port 264.

Capture module 320 may capture all electronic activities performed by the computer processing being performed. For instance, if changes are being made to a document (or file), the versions may be archived automatically and transparently to the application program(s) making their changes. This capture of information may be done periodically or at some specified time (e.g., at the end of the day, at the occurrence of one or more events, etc.) and may be performed much in the same manner as a UNIX dump operation or a well-known comparison operation between current versions of documents and older or previously archived versions of documents.

Capture module 320 communicates with monitoring module 310 to trap a copy of the document data subsequent to monitoring module 310 detecting the activity of the device drivers, such as, for instance, the peripheral's address, an indication, or a signal (e.g., an interrupt signal). Capture module 310 also taps the document data path to enable CFI 330 to process the document data. In one embodiment, capture module catches the document data as the data is sent to its destination device. In an alternative embodiment, capture module 310 may divert the document delivery path through CFI 330 prior to it reaching its destination and the release the data path to CFI 330 in order for document data to be transmitted to the original destination after CFI 330 has completely received the document data.

CFI 330 communicates with capture module 320. In one embodiment, CFI converts the format of the received document data to a desired format for storage in database 340. The document data may be retrieved by CFI 330 in a format generated by an application software package used to generate the document delivery. In the present embodiment, the desired format is Postscript. However, one of ordinary skill in the art will appreciate that other formats may be selected (e.g., GIFF, TIFF, PDF, PCL, FLAS4PIX, plain text, etc.). In alternative embodiments, CFI 330 may not be necessary to convert document data that is received in a format that is acceptable for storage.

Additionally, CFI 330 may apply an indexing system to the documents to be archived in database 340. The indexing system generates index information. The index information may comprise keywords, text, or symbols appearing in the document data, an indication of the application that generated the document data, its destination source address, an address, and/or a low resolution "iconic" representatives for the sage images in the document. The index information generated for a document facilitates full text and document searching later.

Database 340 maintains an archive of documents received from CFI 330. Database 340 may be a relational database that uses clustering which may be context-based (e.g., text) or driver-based (saving data with a file extension associated with the application that generated the document).

In one embodiment, database 340 may be stored in mass storage 230. In an alternative embodiment, database 340 may be stored in other storage devices. In yet another embodiment, IM system 300 allows a user to select between multiple storage devices. In such an embodiment, a user may have the option to select whether database 340 is stored in mass storage 230, PLP 280, or a remote storage facility (also not shown) coupled to network interface 270 via a LAN or WAN system.

Compression unit 350 communicates with capture module 320. Compression unit 350 may compress document data in accordance with a transmission standard (e.g., Facsimile Group III). Note that comparison unit 350 may not be necessary where a reduction in the amount of data being stored is not desired or needed. The compressed document data is transmitted through I/O port 264 to modem 265.

Modem 265 modulates a carrier with the compressed data in accordance with a relevant facsimile transmission standard to generate a modulated signal to output on a telephone line (not shown). The document data is transferred to printer 261 through I/O port 260.

In an alternative embodiment, the document data may be transmitted to network interface 270. In such an embodiment, printer 261 and modem 265 are coupled to network interface 270 via a LAN or WAN system. Thus, all print and fax requests on computer system 200 may be forwarded to a printer and modem, respectively, on a LAN system through network interface 270. One of ordinary skill in the art will recognize that alternative methods may be used to forward print and fax document data to a LAN system without departing from the spirit of the invention.

SRI 370 communicates with database 340. SRI 370 provides access to database 340 in order to search and retrieve archived documents. In one embodiment, SRI 370 may search and retrieve electronic files stored in computer system 200 as well as document images archived in database 340. In another embodiment, SRI 370 may conduct searches and make retrievals utilizing an association between electronic files stored on a user's computer system and archived documents. This is enabled by capturing (in capture module 320) the location of the original source file from which the document was created. This allows users to easily retrieve all captured versions of a given source document. Also, documents returned as the result of a query to database 340 may include links to the original document from which they were created. This allows users to easily invoke the appropriate application software (e.g., Microsoft Word, etc.) so they can modify the original document. In yet a further embodiment, IM system 300 allows SRI 370 to automatically discover links between captured documents and electronic originals. This operation may be performed in different ways. For instance, in U.S. Pat. No. 5,465,353, entitled "Image Matching and Retrieval by Multi-Access Redundant Hashing", issued Nov. 7, 1995, sequences of word lengths are extracted from both captured documents and originals. Links are constructed between two documents if they contain a large number of sequences in common. In U.S. patent application Ser. No. 08/695,825, entitled "Matching CCITT-compressed document images", filed Aug. 1, 1996, patterns of pass codes in CCITT-compressed documents are matched to discover links between image documents that are compressed in this format.

Further, SRI 370 may retrieve a subset of all archived electronic files. For example, an IM system 300 user may select a subset corresponding to all printed documents stored in database 340. In addition, SRI 370 may automatically compute type classifications based upon their content. For example, business letters are easily distinguished from other documents by easily computed characteristics of their images. Techniques such as that described in U.S. Pat. No. 5,642,288, entitled "Intelligent Document Recognition and Handling", issued Jun. 24, 1997, could be used for this purpose.

In an alternative embodiment, IM system 300 may automatically archive a digital image of documents any time a document file is saved. In this embodiment, monitoring module 310 polls computer system 200 for, and detects, a command to write an electronic document to mass storage 230. Capture module 320 obtains a copy of the document data and forwards the copy to CFI 330, subsequent to monitoring module 310 detecting activity of the device drivers (e.g., an interrupt generated). Capture module 310 may further release the data path to the initial destination after CFI 330 has completely received the document data. CFI 330 converts the format of the received document data to a desired format, as well as indexing the data, for storage in database 340. Database 340 maintains an archive of documents. According to one embodiment, database 340 is stored in PLP 280. However, one skilled in the art will appreciate that database 340 may be stored in memory 220, mass storage 230 or other types of storage devices.

In yet another embodiment, a calendar user interface may be included in IM system 300. This interface displays associations between events (e.g. appointments, meetings, trips) and documents captured at the time these events occurred in a metaphor (the calendar) that is familiar to users. The events may be recorded in a calendar manager software application. Calendar views are created that merge events and representations for documents (e.g., document icons hyperlinked to an archived version of the document).

Figure 4:
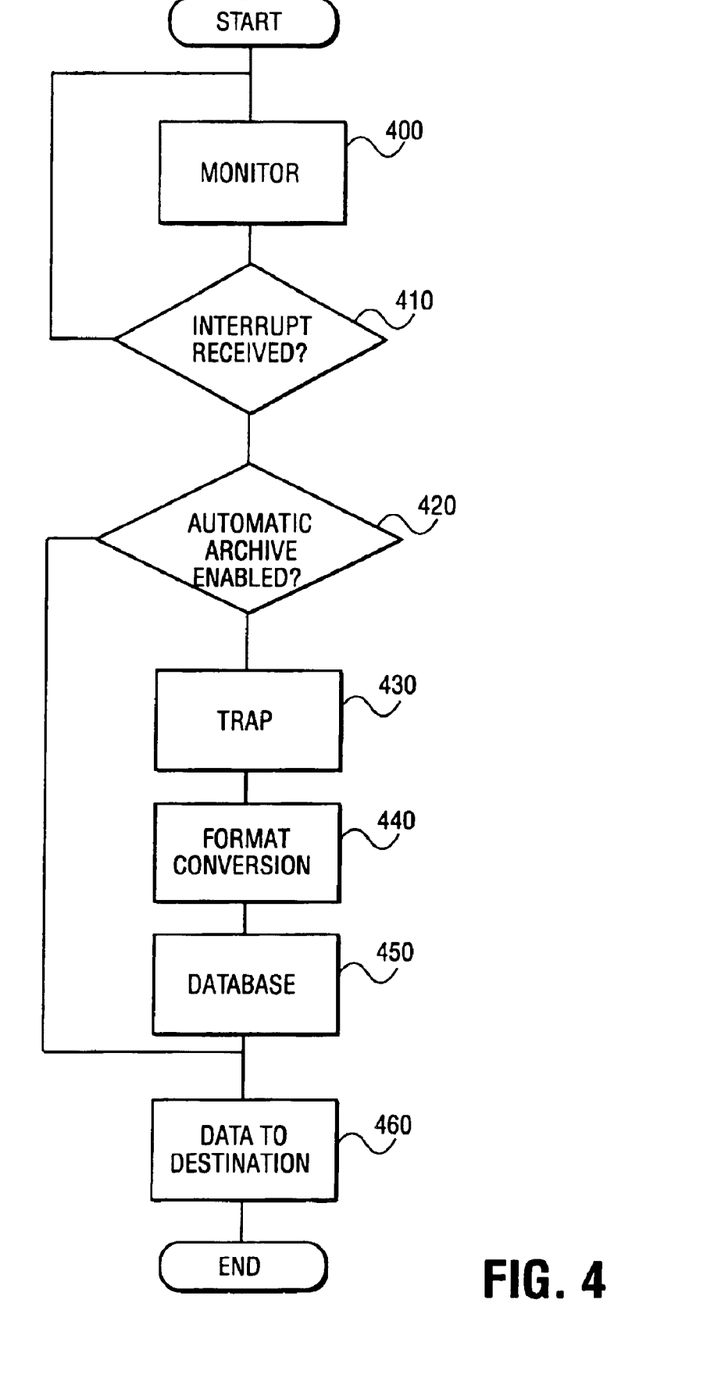
FIG. 4 illustrates a flow chart of the processing of the Image Management system of the present invention.

Referring to FIG. 4, a flow diagram of the operation of IM system 300 is illustrated. Initially, processing logic of IM system 300 monitors device activity associated with I/O ports 260 and 264 and network interface 270 preceding document data to be delivered to printer 261, modem 265, or to another computer system peripheral, respectively (processing block 400). In addition, processing logic of IM system 300 may poll computer system 200 for a command to write to mass storage 230. Then, processing logic determines whether such activity occurred (e.g., an interrupt signal is received) (processing block 410). If the activity is not detected, processing logic of IM system 300 continues to poll. Next, processing logic determines whether the automatic archiving option is enabled (processing block 420).

If the automatic archiving function of IM system 300 is enabled, capture module 320 obtains the document data and sends it to CFI 330 (processing block 430). Thereafter, CFI 330 converts the format of the received document data to a desired format (processing block 440). In addition, the document data is indexed for storage in database 340. Next, the converted document data is transferred to database 340 where it is stored (processing block 450). The document data is also sent to mass storage 230 (processing block 460). Alternatively, document data is transferred to compression unit 350 for faxing, print driver 360 for printing, or network interface 270 for sending electronic mail. If the automatic archiving function is disabled, the document data is written directly to mass storage 230, or transmitted to the appropriate peripheral device or network interface. In an alternative embodiment, IM system 300 transmits the document data to its destination before archiving. In yet another embodiment, IM system 300 alternates between transmitting document data to the destination device and archiving the document data.

It is apparent that no explicit action is required by a user to archive a document. Consequently, the time consuming process of scanning documents is no longer necessary. In addition, due to the guarantee that in one embodiment every document produced is archived, document management is significantly improved.

From the above description and drawings, it will be understood by those of ordinary skill in the art that the particular embodiments shown and described are for purposes of illustration only and are not intended to limit the scope of the invention. Those of ordinary skill in the art will recognize that the invention may be embodied in other specific forms without departing from the spirit and essential characteristics. References to details of particular embodiments are not intended to limit the scope of the claims.

What is claimed is:

1. A method for processing documents in a computer system, the method comprising:

transferring document data associated with a document between a processing device and a peripheral device in the computer system as part of executing an application program;

generating index information associated with the document data; and archiving the document data with the index information in a memory in the computer system in conjunction with transferring the document between the processing device and the peripheral device transparently to the application program.

2. The method defined in claim 1 further comprising executing a command, as part of execution of the application program, to transfer the document between the processing device in the computer system and the peripheral device.

3. The method defined in claim 1 wherein the index information is selected from a group consisting of one or more keywords appearing in the document, text appearing in the document, one or more symbols appearing in the document, an indication of the application program, an address, and a low resolution iconic representation for an image in the document.

4. The method defined in claim 1 further comprising searching for the document in the memory using the index information.

5. The method defined in claim 1 wherein archiving the document data is performed transparently to an operating system running on the computer system.

6. The method of claim 5 wherein archiving the document data comprises:
running software on the computer system to monitor a device driver for the peripheral device while the application program runs;
capturing the document data when the device driver operates to invoke transfer of the document data; and
converting the document data to an image of the document data.

7. The method of claim 6, wherein the document image is stored in a format that includes one format from the group consisting of Postscript, PCL, TIFF, GIFF, PDF and FLAS4PIX.

8. The method of claim 6, wherein the document image is stored in a text file format.

9. The method of claim 1, wherein the memory is a storage device in which storage is partitioned between a file archiving system and a document archiving system.

10. The method of claim 9, wherein the document data is stored as an entry in a database maintained in the storage device.

11. The method of claim 1, wherein the document data is stored as a record in a database maintained in a remote storage facility.

12. The method of claim 1, wherein the document data is stored as a record in a database maintained in a paperless printer.

13. The method of claim 1, further comprising capturing a source filename of the document.

14. The method defined in claim 13, further comprising providing links between an archived document data and the original document data.

15. The method of claim 1, wherein the peripheral device is coupled to a network interface of the computer system.

16. The method of claim 1, further comprising accessing archived documents via a browser interface.

17. The method defined in claim 16 further comprising accessing files stored in the memory storing the archived documents using the browser interface.

18. A method for automatically archiving document images in a computer system, the method comprising:
capturing a copy of document data transferred between the peripheral devices and the at least one processing device transparently to an application programs while the application programs transfers the document data between peripheral devices in the computer system and at least one processing device running application programs in the computer system;
generating index information associated with the document data; and
storing the document data with the index information in a memory in the computer system.

19. The method defined in claim 18 wherein the index information is selected from a group consisting of one or more keywords appearing in the document, text appearing in the document, one or more symbols appearing in the document, an indication of the application program, an address, and a low resolution iconic representation for an image in the document.

20. The method defined in claim 18 further comprising searching for the document in the memory using the index information.

21. The method of claim 18 further comprising:
capturing electronic activities of computer system processing; and
storing a document containing a record of the electronic activities in the memory.

22. The method of claim 18 further comprising:
capturing completion of a network document; and
storing the network document as a record in the memory.

23. The method defined in claim 18 wherein storing the document data is performed transparently to the operating system.

24. The method of claim 18, further comprising:
running software on the computer system to monitor a device driver for the peripheral device while application programs run;
capturing the document data when the device driver operates to evoke transfer of document data; and
converting the document data in an image of the document data for storage.

25. The method of claim 18, further comprising accessing archived documents via a browser interface.

26. The method defined in claim 25, further comprising accessing files stored in the memory using the browser interface.

27. A computer system comprising:
at least one peripheral device;
a memory storing at least one application program and an archiving program;
a bus coupled to the memory and the at least one peripheral device;
a processor coupled to the bus, the processor running at least one application program and the archiving program to automatically capture documents created during execution of said at least one application program, generate index information associated with document data of the documents, and store captured documents with the index information in the memory via execution of the archiving program transparently with respect to said at least one application program.

28. The system defined in claim 27 wherein the index information is selected from a group consisting of one or more keywords appearing in the document, text appearing in the document, one or more symbols appearing in the document, an indication of the application program, an address, and a low resolution iconic representation for an image in the document.

29. The system defined in claim 27 wherein the processor executes a command to transfer the document and the archiving program monitors a device driver of said at least one application program to capture the document.

30. The system defined in claim 27 wherein the memory stores an operating system which is executed by the processor and wherein the documents are captured transparently to the operating system.

31. The system defined in claim 27 wherein the computer system is partitioned between a file archiving system and a document archiving system.

32. The system defined in claim 27 wherein the archiving program includes an interface which is generated by the processor to enable accessing of the archived documents via a browser interface.

33. The system defined in claim 32 wherein files stored in the memory are also accessed via the browser interface.

34. A computer software product including a medium readable by a processor, the medium having stored thereon a sequence of instructions which, when executed by the processor, causes the processor to:

transfer document data associated with a document between a processing device and a peripheral device in the computer system as part of executing an application program;

generate index information associated with the document data; and archive the document data with the index information in a memory in the computer system in conjunction with transferring the document between the processing device and the peripheral device transparently to the application program.

35. The article of manufacture defined in claim 34 including instructions which when executed by the processor cause the processor to execute a command, as part of execution of the application program, to transfer the document between the processing device in the computer system and the peripheral device.

36. An apparatus for processing documents in computer systems comprising:

means for executing a command, as part of execution of an application program, to transfer a document between a processing device in the computer system and a peripheral device;

means for transmitting document data between the processing device and the peripheral device in response to the command;

means for generating index information associated with the document data; and means for archiving the document data with the index information in a memory in the computer system in response to the command to transfer the document between the processing device and the peripheral device transparently to execution of the application program.

37. The apparatus defined in claim 36 further comprising:

means for capturing a source filename of the document, and means for providing links between archived document data and the electronic originals.

* * * * *